3,397,993
PROCESS FOR PREPARING FROZEN FRENCH FRY POTATO SEGMENTS
William K. Strong, Addison, Ill., assignor to McDonald's System, Inc., a corporation of Illinois
No Drawing. Filed Sept. 20, 1965, Ser. No. 488,742
9 Claims. (Cl. 99—100)

ABSTRACT OF THE DISCLOSURE

A process for preparing frozen french fried potatoes which when finish fried closely simulate french fried potatoes prepared from fresh potatoes, in which potatoes are peeled, trimmed, cut into elongate segments, blanched as with steam to translucency, dehydrated internally and from the surface to a weight loss of up to about 35%, fried for a short time and then frozen prior to finish frying.

---

This invention relates to the preparation of potato segments suitable for french frying and to the preparation of french fried potatoes therefrom.

Vast quantities of french fried potatoes are prepared and consumed daily in this country and elsewhere. Their quality varies not only with their method of preparation and with the degree of uniformity with which they are prepared but also with the raw potatoes available from which they are made. The availability of raw potatoes of consistent characteristics varies with the season of the year. As a result, even where great care is exercised in seeking to maintain a product of uniform quality throughout the year, which many retail outlets seek to do, it is virtually impossible to do that because of the variations in the available raw potatoes.

One solution to obtaining uniformity in quality is the utilization of a frozen french fry rather than a raw potato at the retail outlet. In such a case the frozen french fry may be prepared during a season of the year when the most desirable raw potatoes, such as Russet Burbank potatoes, are available and then may be used by the retailer throughout the year.

While that solution to the problem of lack of uniformity seems desirable, the prepared frozen french fry potatoes currently available are so different in taste and quality from the product prepared directly from raw potatoes, even of a less desirable quality, that they have been unacceptable to many retail outlets for use as a substitute for french fried potatoes prepared directly from fresh raw potatoes.

This invention concerns itself with a method of preparing a frozen french fried potato which after a single finish cooking by a retailer has substantially the taste, quality and characteristics as a french fried potato prepared directly from a raw potato.

In accordance with this invention raw potatoes are subjected to a number of process steps. First, if the raw potatoes are high in reducing sugar, they are pre-conditioned for one to three weeks at room temperature until the sugar content has reached the desired level. Frequently such pre-conditioning is unnecessary. Thereafter the potatoes are cleaned and peeled as by abrasion, steam, lye or by other means well known in the art. The potatoes are then trimmed of blemishes and cut, either in a crinkle cut or a conventional square shape. The usual size of the cut is from ¼ to ½", square in cross section. The elongated strips are then washed free of surface starch to minimize adhesion of the strips to each other as they are processed. The washing is accomplished by fluming, barrel washing or any other conventional expedient therefor.

The strips are then blanched until all portions receive enough heat to turn them to a generally translucent condition throughout. Care must be exercised in blanching because those portions which are underblanched will turn offcolor during subsequent processing due to enzymes which are not inactivated and the surfaces of those portions which are overblanched may slough especially with potatoes of high solids content. The blanching preferably is effected by steam, such as atmospheric steam for a period of from about 2 to about 10 minutes during which time all surfaces of the strips are exposed to the steam. At elevated pressures the blanching time will decrease. However a hot water blanch may be used with substantially equivalent results for about 3 to about 8 minutes at a temperature of from about 160° F. to about 200° F. The times and temperatures, both of the steam and water, may vary with the equipment used, the quantity of potatoes treated, their initial temperature, the dimensions of the strips, among other things as will be appreciated by those skilled in the art.

Once the strips are blanched they are dehydrated by subjecting them to heated air currents to reduce their moisture content. Desirably all surfaces of the strips are exposed to the heated air for from about 5 to about 20 minutes at air temperatures of from about 150° F. to about 350° F., depending, as will be appreciated by those skilled in the art, upon the equipment used, the quantity of strips, the dimension of the strips, among other things. During the hot air dehydration of the strips the moisture content is reduced to a point at which the strips have lost about 20% of their initial weight and up to about 30% of their initial weight.

Thereafter the partially dehydrated strips are immersed in a deep fat fryer for a short period of time, for example from about 15 to about 60 seconds at a fat temperature of about 300° F. to about 375° F., during which time the moisture content is still further reduced and during which time the strips are partially fried.

The strips are then frozen. That is accomplished either by placing the strips directly into a freezer or by first cooling the strips and then freezing them to about 0° F. They may be maintained in their frozen state for many months for use when necessary. They are packaged as desired.

When the consumer, such as a retailer of french fried potatoes, is ready to use the potatoes he need merely immerse the frozen strips in a deep fat or oil bath at a temperature of from about 300 to about 375° F. for a period of from about 1½ to about 3½ minutes, depending upon the bath size, the quantity and size of the strips, their initial temperature among other factors which will be apparent to those skilled in the art.

French fried potatoes prepared in accordance with this invention closely resemble french fried potatoes prepared from prime raw potatoes and are at least as good and sometimes better than those prepared from non-prime potatoes. They are therefore at least as good in quality, taste, interior texture, color and crispness as the average produced from raw potatoes. When compared to other frozen french fried potatoes they are superior in overall quality, are crisper. taste better and have a better texture internally.

It is therefore apparent that this invention provides a french fried potato strip of high quality, substantially identical to french fries produced from raw unfrozen potatoes, and superior to frozen french fried potato strips which are presently available. The provision of a high quality french fried potato in accordance with this invention makes possible the utilization of frozen potatoes where quality is demanded, a demand which present frozen potatoes do not satisfy. The use of frozen french fries makes uniform quality throughout the year a possibility and makes possible the elimination of certain equipment in the retail establishment which is necessary for preparing french fries from fresh potatoes. That, because only a single finish fry is necessary, rather than the multiple fry periods presently used, because an extended cooling and holding period between fry periods is eliminated, because peeling, cutting and washing and cleaning equipment is unnecessary, all resulting additionally in a substantially lesser space and labor requirement at the retail outlet.

These and other advantages and purposes of this invention will become apparent from the following description thereof and from the following examples.

In a presently preferred embodiment of this invention, sometimes referred to as the first example, a quantity of about three pounds of Russet Burbank variety potatoes having a 78% moisture content (22% solids) were cleaned, peeled, trimmed as necessary, and cut into 9/32" cross-section elongated strips with a restaurant type french fry cutter. The strips ranged from about 3 to about 6 inches in length. The cut strips were washed free of surface starch by agitating them in successive water baths until the wash water remained substantially clear.

Two pounds of the washed strips were placed in a perforated basket and were steam-blanched for a period of 7 minutes at atmospheric pressure. The steam blancher used was an enlarged closed vessel, vented to allow steam to escape, containing water which was brought to its boiling point by a submerged heating element. The steam rising from the surface of the water passed through the basket containing the strips positioned above the water level for the 7 minute period. At the end of that period the potato segments had a generally translucent appearance.

Thereafter the blanched strips were positioned in a slowly rotating cylindrical drum having internal baffles for tumbling the potato strips slowly and gently. The cylindrical drum rotated about an axis slightly inclined from the horizontal. A stream of heated air was forced by a blower against the potato strips contained by the cylindrical drum. The temperature of the heated air was 300° F. and the dehydrating time was 9 minutes. The potatoes were removed at the end of the 9 minute period and were found to weigh 1½ pounds for a weight loss of 25%. The dried strips were then placed in a frying basket, immersed in a deep fat bath and deep fat fried for 30 seconds at a temperature of 325° F. During the frying period an additional 5% of the original weight was lost for a final product weight of about 70% of the original potato strip weight. The potato strips were then placed on a metal tray and positioned in a freezer until they were frozen to a temperature of about 0°F.

Thereafter the frozen strips were removed from the freezer, were placed in a frying basket and were immersed in a deep fat frying bath for a period of 2½ minutes at a fat temperature of 325° F. The potato strips were removed, were salted and were ready for eating. The french fried potato strips had a crisp, crunchy mouth-feel, their flavor was natural and substantially the same as the flavor of potatoes freshly prepared from raw potatoes and the interior texture was desirably mealy. These potatoes in quality, texture, color and taste were substantially the same as the average potato prepared in a conventional manner from fresh raw potatoes. The quality of the french fried potatoes was superior in texture, crispness, taste and color to those prepared by conventional frozen french fry processes.

Another quantity of about three pounds of 22% solids content White Rose variety, also known as California Long White, potatoes were cleaned, peeled and cut into 3/8" cross-section elongated strips with a restaurant type french fry cutter. The cut strips were washed as described in the first example.

Two pounds of the washed strips were placed in a steamer and were steamed for a period of 12 minutes at atmospheric pressure in the manner described in the preceding example and with the same results. Thereafter the blanched strips were dehydrated in the manner described in the preceding example by heated air at a temperature of 300° F. for 17 minutes. The potatoes were removed and found to weight 1½ pounds for a weight loss of 25%. The dried strips were then placed in a frying basket, immersed in a deep fat bath and deep fat fried for 50 seconds at a temperature of 325° F. During the frying period an additional 5% of the original weight was lost for a total weight loss of 30%. The potato strips were then placed on a metal tray and positioned in a freezer until they were frozen, to a temperature of about 0° F.

Thereafter the frozen strips were removed from the freezer, were placed in a frying basket and were immersed in a deep fat frying bath for a period of 3½ minutes at a fat temperature of 335° F. The potato strips were removed, were salted and were ready for eating. The french fried potato strips had a crisp, crunchy mouth-feel, their flavor was natural and substantially the same as the flavor of potatoes freshly prepared from raw potatoes and the interior texture was desirably mealy. These potatoes in quality, texture, color and taste were like potatoes prepared in a conventional manner from fresh raw potatoes. The quality of the french fried potatoes was superior in texture, crispness, taste and color to those prepared by conventional frozen french fry processes.

Another quantity of about three pounds of 22% solids content California Long White potatoes were cleaned, peeled and cut into 9/32" cross-section elongated strips with a restaurant type french fry cutter. The strips were then washed and blanched in the manner described in the first example with similar results, and were dehydrated by heated air in the manner stated in the first example at a temperature of 300° F. but for 7 minutes. The potatoes were removed and found to have a weight loss of 20%. The dried strips were then placed in a frying basket, immersed in a deep fat bath and deep fat fried for 50 seconds at a temperature of 325° F. During the frying period an additional 10% of the original weight was lost for a total weight loss of 30%. The potato strips were then placed on a metal tray and positioned in a freezer until they were frozen, to a temperature of about 0° F.

Thereafter the frozen strips were removed from the freezer, were placed in a frying basket and were finish fried in the manner described in the first example, were salted and were ready for eating. The characteristics of these potato strips were the same as those described in the preceding examples and compared with freshly prepared french fries and frozen french fries in the manner there described.

While in the foregoing examples specific times and temperatures have been given to illustrate this invention, the invention is not limited thereto. Thus, depending upon the quantity and dimensions of the potato strips and the equipment, among other things, the steam blanching may extend from about 2 to about 10 minutes, the dehydration may be for from about 5 to about 20 minutes at temperatures of from about 150° F. to about 350° F. and the first deep fat fry may be for about 15 to about 60 seconds at bath temperatures of from about 300 to about 375° F. The weight loss of the strips prior to freezing is up to about 35%, the major portion of this occurring during dehydration and the minor portion occurring during the short fry period. During the short fry period some of the fry fat or oil is taken up by the potato strips so that the weight loss represents a greater amount of water loss than the percentage indicated. The finish fry, the only processing required after freezing, may be from about 1½ to 3½ minutes and at an initial deep fat bath temperature of about 300 to about 375° F.

Variations in times, temperatures and the like from the aforementioned ranges may occur from time to time depending upon the equipment used and the characteristics of the potatoes and potato strips themselves. It will be understood that the initial moisture content of raw potatoes may vary from about 76 to about 84% (24 to 16% solids) and when a potato of an unusually high moisture content is used generally somewhat more moisture will be driven off thereby resulting in a higher percentage weight loss than 30%, for example 35%. Additionally, for example, some may prefer a final weight loss of slightly greater than what I consider to be the optimum, i.e., about 30%, even with lower moisture content potatoes. Further the specific equipment used will have some bearing upon the times and temperatures of the various processing steps. It will be apparent to those skilled in the art that a variety of suitable equipment may be used. For example a mesh belt dryer provided with air to impinge upon the potato strips may be used instead of the cylindrical drum referred to in the preceding examples.

A further quantity of about three pounds of 22% solids content California Long White potatoes were cleaned, peeled and cut into ⁹⁄₃₂" cross-section elongated strips with a restaurant type french fry cutter. The cut strips were washed free of surface starch by agitating them in water repeatedly until the wash water remained clear.

Two pounds of the washed strips were blanched in hot water at a temperature of 190° F. for 5 minutes. Thereafter the blanched strips were removed and were dehydrated in the manner described in the first example to a weight loss of 25%. The dried strips were then placed in a frying basket, immersed in a deep fat bath and deep fat fried for 30 seconds at a temperature of 325° F. During the drying period an additional 5% of the original weight was lost for a total weight loss of 30%. The potato strips were then placed on a metal tray and positioned in a freezer until they were frozen to a temperature of about 0° F.

Thereafter the frozen strips were removed from the freezer, were placed in a frying basket and were immersed in a deep fat frying bath for a period of 2½ minutes at a fat temperature of 325° F. The potato strips were removed, were salted and were ready for eating. The french fried potato strips were crisp, had a crunchy mouth-feel, and the interior texture was desirably mealy. The flavor was not quite as good as the steam blanched potato strips because the water blanch leached out some of the soluble flavoring components that contribute to good potato flavor, but the overall flavor was acceptable and considerably better than conventional frozen french fried potatoes. In quality and texture and in color and taste the french fried potatoes were very similar to those prepared in a conventional manner from fresh raw potatoes. The quality of the french fried potatoes was superior in texture, crispness, taste and color to those prepared by conventional frozen french fry processes.

In the foregoing example the water blanch temperature was 190° F. and the blanching continued for 5 minutes. However the blanch temperature may be from about 160° to about 200° F. and for about 3 to about 8 minutes depending upon the quantity and dimensions of the potatoes, the type of potatoes, the size of the blanch bath, among other things. The other process steps may vary in the manners previously described.

Not only are the potatoes produced by the practice of this invention substantially identical to freshly prepared french fried potatoes and superior to present frozen french fried potatoes, but the process makes possible the elimination of a substantial amount of conventional equipment at a retail establishment. All that is required at the retail outlet is a single deep fat bath and facilities for storing the frozen partially prepared french fried potatoes. The labor and space for peeling, cutting, washing, blanching, holding and the like are eliminated, something highly desirable where space is at a premium, such as at a high-volume drive-in restaurant operation.

I claim:

1. In a process for preparing elongate frozen fried potato segments, wherein said potatoes are first peeled, trimmed, cut into elongate segments and washed, the steps comprising blanching said segments for a time sufficient to inactivate the enzymes and to produce a translucent appearance generally throughout said segments without blanching substantially beyond translucency, after blanching, then dehydrating said segments in circulating air at a temperature greater than ambient by directing said air against the segments, the weight of said potato segments thus being gradually reduced by about 20% to less than about 35% of the weight of the original potato segments, the moisture being removed both internally of and from the surface of said potato segment, after dehydrating, then frying said potato segments in a deep fat bath for from about 15 to about 60 seconds and at a bath temperature of from about 300° F. to about 375° F. to further reduce the moisture content of said potato segments and to partially fry the same, then, after frying, cooling said potato segments downwardly to a temperature of at least 0° F. to freeze them, whereby said frozen segments, when finish fried for about 1½–3½ minutes at a fat bath temperature of from about 300 to about 375° F., resemble in quality, taste and appearance french fried potatoes freshly prepared from fresh potatoes.

2. In the process of claim 1 wherein the dehydration takes place at a temperature of about 150° F. to about 350° F. and for a period of time of from about 5 to about 20 minutes.

3. In the process of claim 1 wherein said blanching of the potato segments is with steam.

4. In the process of claim 3 in which said steam blanching is for from about 2 to about 10 minutes.

5. In a process for preparing frozen partially fried elongate potato segments in which potatoes are peeled, trimmed, cut into elongate segments and washed, the steps comprising exposing the segments to steam for a time sufficient to deactivate the enzymes and produce a translucent appearance in the segments substantially throughout the segments, contacting the segments with circulating heated air on all surfaces thereof to reduce the weight of the potato segments by at least about 20%, water being removed both from the surface of and internally of the segments, frying the segments in a deep fat bath at a temperature of from about 300° F. to about 375° F. for up to about 1 minute to further reduce the moisture content of said segments, and then freezing the potato segments.

6. In the process of claim 5, in which the steaming takes place for from about 2 to about 10 minutes in a vessel open to the atmosphere.

7. In the process of claim 5 in which the exposure to the circulating heated air is for from about 5 to about 20 minutes.

8. In the process of claim 5 in which the weight loss during air heating is from about 20% to about 35% of the weight of the potato segments.

9. In the process of claim 5 in which the frozen potato segments are finish fried by immersing them in a single deep fat for from about 1½ to about 3½ minutes at a temperature of from about 300 to about 375° F. whereby when they are removed from said bath they closely resemble in taste, quality and appearance french fried potatoes freshly prepared from fresh potatoes.

(References on following page)

References Cited

UNITED STATES PATENTS 2,101,506 12/1937 Morrow et al. _____ 99—100
3,244,538 4/1966 Kaehler _____ 99—199

OTHER REFERENCES

Talburt, W. F. et al.: Potato Processing. The Avi Publishing Co., Westport, Conn., 1959, SB 211, P 8t3, C. 2 (pages 286–292).

Fustel, I. C., et al.: Processing of Frozen French Fried Potatoes and Other Frozen Potato Products, ARS–74–8, May 1963 (pages 17–24 and 33).

ALVIN E. TANENHOLTZ, *Primary Examiner.*

D. M. NAFF, *Assistant Examiner.*